United States Patent [19]

Spalding

[11] 4,149,383
[45] Apr. 17, 1979

[54] INTERNAL VAPORIZATION ENGINE

[76] Inventor: Wesley H. Spalding, 14232 N. Linden Rd., Clio, Mich. 48420

[21] Appl. No.: 820,222

[22] Filed: Jul. 29, 1977

[51] Int. Cl.² .................. F01K 21/02; F01K 25/10
[52] U.S. Cl. ............................................. 60/509
[58] Field of Search ................................. 60/508–515

[56] References Cited

U.S. PATENT DOCUMENTS

| | | | |
|---|---|---|---|
| 1,778,817 | 10/1930 | Spiro | 60/514 |
| 2,830,435 | 4/1958 | Mallory | 60/514 |
| 2,867,975 | 1/1959 | Mallory | 60/514 |
| 3,479,817 | 11/1969 | Minto | 60/671 |
| 4,077,214 | 3/1978 | Burke et al. | 60/512 |

FOREIGN PATENT DOCUMENTS 501570  1/1920  France .............................. 60/514

Primary Examiner—Allen M. Ostrager
Attorney, Agent, or Firm—Harry R. Dumont

[57] ABSTRACT

An engine powered by the internal vaporization of a low boiling point liquid such as Freon which is changed into the gaseous state by a suitable heat source applied to the engine. The engine control system further includes a closed Freon well for condensation of the Freon gas after vaporization in the engine. The vaporization of the Freon within the engine is provided by heat collected by a solar furnace and passed from a oil heat jacket surrounding the engine piston acting as a heat source.

6 Claims, 4 Drawing Figures

INTERNAL VAPORIZATION ENGINE

BACKGROUND OF THE INVENTION

The more common internal vaporization engines, for example, steam engines, utilize water which requires relatively high temperatures to be changed from the liquid to the vapor state and provide the motive force to the engine. Other engines have been developed which utilize much lower boiling point liquids such as dichlorodiflouromethane ($CCL_2F_2$) also known as Freon 12 and commercially obtainable from the Dupont Company. An example of an engine of this general type is shown and described in U.S. Pat. No. 2,513,692 issued on July 4, 1950 to C. L. Tubbs for "Vapor Engine Driven by Expansion and Contraction of Vapor". Other engines have been developed which take advantage of the availability of solar heat to be used in conjunction with a working fluid circuit. An example of this type of engine and control system is shown and described in U.S. Pat. No. 3,916,626 issued to G. O. Schur on Nov. 4, 1975, for "Thermally Powered Generating System Employing a Heat Vapor Bubble Engine". Still other power generating systems and engines have been developed which utilize the temperature differential between the surface region and lower regions of the earth or as otherwise stated utilize naturally occurring geothermal temperature differences in their operating systems.

A BRIEF STATEMENT OF THE PRESENT INVENTION

The present invention will be seen to combine the advantages residing in the use of a low boiling liquid and in further providing a source of heat for the engine and for the vaporization of the liquid which is derived from a solar heating device. Return of the vaporized fluid to its liquid state is achieved by a cooling well system which forms an important part of the engine and engine operating system.

BRIEF DESCRIPTION OF THE DRAWINGS

Referring to the drawings, the invention will now be described in detail with reference to the following drawings in which like numerals are used to refer to like elements where they occur in different figures or portions of the drawings and wherein.

DETAILED DESCRIPTION OF THE PREFERRED EMBODIMENT

Figure 1:
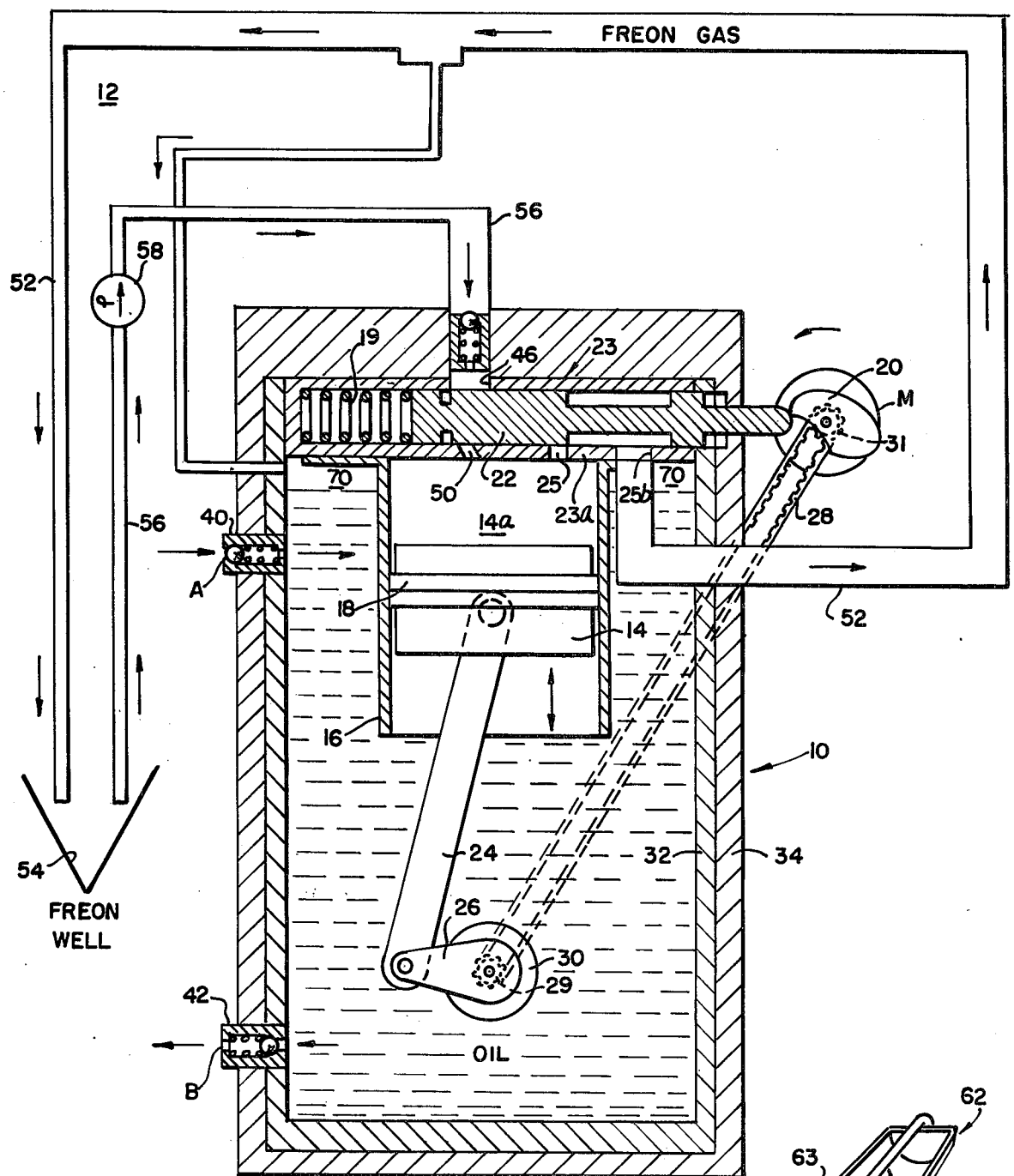
FIG. 1 is a combined schematic and detail drawing showing the invention in which the engine itself is shown in vertical section.

FIG. 1 shows the detail of the internal vaporization engine 10 and further illustrates the basic parts of the Freon handling system 12. The engine 10 included a piston 14 which is moveable vertically in a reciprocal fashion within a cylinder 16. The piston 14 includes a ring 18 as shown. The basic timing of the operation of the engine is provided through a cam 20. The cam 20 operates to time the movement of a Freon inlet valve operator 22 of a flow control valve 23 and in turn is connected for phased operation with the piston 14 through a crank arm 24, a link 26, and a toothed belt 28 which is connected at its left end to a common shaft 29 on which the like 26 is mounted and at its right end to a shaft 31 forming the axis of rotation for the cam 20. A flywheel 30 is preferably included as shown to provide for a smoother operation of the engine. The engine further includes an inner casing or oil jacket 32 which in turn is enclosed by a outer insulating cylinder 34. The heat required for the vaporization of the liquid Freon to provide the operation of the engine 10 is derived from the oil jacket 32 into which oil preheated by solar energy is pumped at an elevated temperature inwardly through a port A. Oil after it is cooled is passed outwardly through a port B near the bottom of the jacket 32. The manner in which the oil is heated from an external source preferably a solar furnace, is shown more clearly in FIG. 4 hereinafter. A check valve 40 is shown positioned in port A while a further check valve 42 is shown positioned in port B. With respect to the Freon flow valve operator 22, it is maintained in its opened valve position as shown in FIG. 1 at the point of halfway travel of the piston 14 during the power portion of its operating cycle. Liquid Freon is being admitted to the inlet port 46 at the upper end of the valve 22 through the check valve 48. A plurality of intake passages 50 three or four in number are incorporated in the lower surface of the body 23a of the valve 23 to provide for admission of the liquid Freon into the chamber above the piston 14. In this manner, the liquid Freon is properly placed above the piston 14 prior to the expansion of the gas from its liquid form to its gaseous form. This expansion occurs by the application of the heat from the hot oil jacket 32 particularly from the hot oil being admitted through the port A adjacent the upper end of the cylinder 16 through the valve 40. This results in a powerful downward stroke of the piston 14 with rotation of the cam 20 by the operation of the connecting belt 28. On the upward stroke of the piston 14, the Freon gas is permitted to escape through the outward line 52. Slotted openings 25 and 27 are provided as shown. A further return line for the Freon gas is provided by a line 52a. The Freon gas then passes to a cooling well 54 which may extend as much as 20 to 30 meters into the earth and provides a temperature differential sufficient to change the Freon back from its gaseous back to its liquid state. In preparation for the Freon to be used again in the engine, it is pumped upwardly through a return line 56 by the action of a pump 58 and again in its liquid form it is presented to the port 46 from the valve 52. It will be understood that the Freon well 54 must be maintained at a pressure sufficiently above the condensing pressure level to keep the liquid Freon from boiling in the valve 48 at the time when pressure is lowered in the cylinder 16 for Freon injection. The valve 23 has an insulation layer above and below it.

Figure 4:
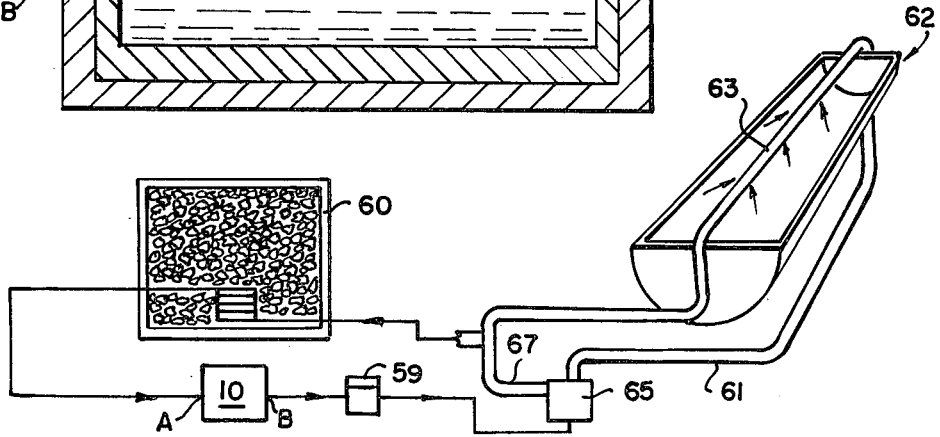
FIG. 4 is a combined block diagramatic and schematic illustration of the oil heating portion of the system.

With reference to FIG. 4, the heated oil in the oil heat jacket 32 inside the engine 10 is replenished by the flow of oil from a heat bank 60 in which is collected the heat from a solar furnace 62. An expansion chamber 59 is included in the line communicating with port B as shown. The solar furnace 62 is preferably of the parabolic trough type to provide maximum heating efficiency. The solar furnace 62 further should be of a capacity sufficient to charge up the heat bank 60 to a relatively high temperature level to enable the engine 10 to operate continuously for long periods of time. It will be understood that supplemental heat systems could be added with secondary heat sources but this normally will not be required. The circulation for the oil through the system is provided by the reciprocating upward and downward movement of the piston 14 aided by the operation of a pump, not shown, if this proves necessary.

The down stroke of the piston 14 forces the oil out through the lower check valve 42 and through the port B which in turn feeds it to the solar furnace 62. In the solar furnace 62, a continuous flow of oil is maintained through an input line 61 and a horizontal pipe 63 so that maximum heat is received. If the solar furnace 62 is not in operation, then the flow of oil would be diverted by a bypass valve 65 directly from the outlet port B of the engine 10 through a line 67 to the heat bank 60 where the stored heat would then be used to elevate the temperature of the oil.

Figure 2:
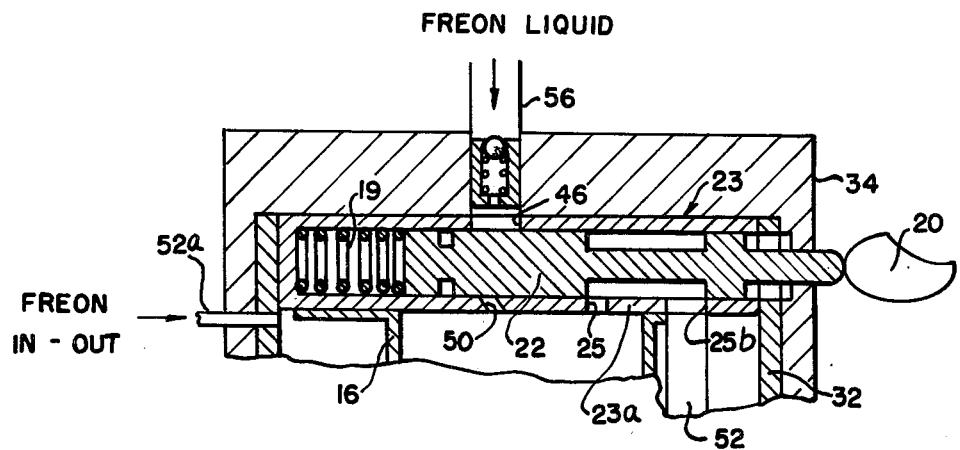
FIG. 2 is a fragmentary sectional view of the engine showing the cylinder and valve in the exhaust portion of the cycle.
Figure 3:
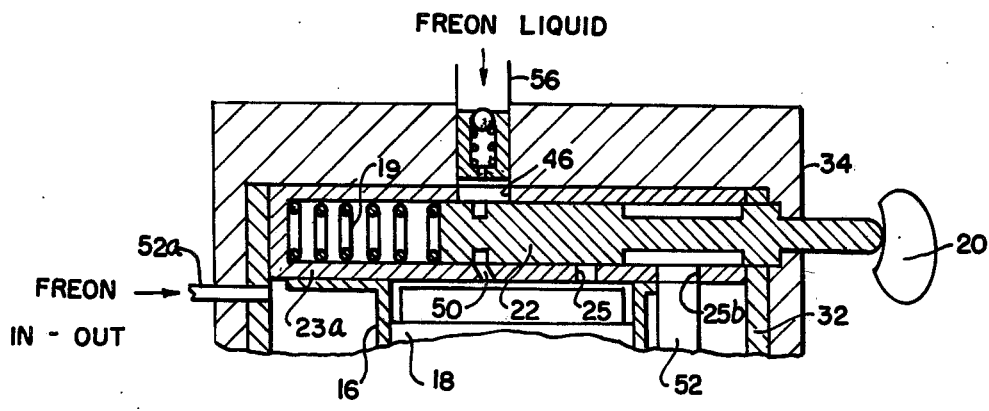
FIG. 3 is a view similar to FIG. 2 showing the engine in its partial intake portion of the cycle.

As best shown in FIG. 2, the up stroke of the piston 14 will create a partial vacuum in the heat jacket 32 which will assist in opening the inlet check valve 40 and thus draw heated oil into the heat jacket. An air or Freon cushion 70 is preferably maintained at the top of the engine 10 which enables the piston 14 to go up and down without hammering effect. When the piston is halfway through the down cycle, the air or Freon cushion and the Freon system have equal pressure. Attention will now be given to the Freon cycle as it affects the operation of the engine 10. When the piston 14 is moved upwardly by the pressure built up in the heat jacket and by kinetic force of the flywheel 30, the crank including arm 24 and link 26 will turn and this will rotate the cam 20 by means of the operation of the intermediate toothed belt 28. It will be seen that the valve operator 22 is biased against the control lobe surface of the cam 20 by a spring 19 at its lefthand end. As best shown in FIG. 3, rotation of the cam 20 in a counterclockwise direction will then allow the movement of the Freon valve operator 22 rightwardly into a position sufficient to allow injection of the liquid Freon through the port 46 inside the chamber 14a above the piston 14. The liquid Freon is drawn during the partial intake portion of the cycle into the upper end of the cylinder 16 by the down stroke and the partial vacuum resulting from the downward movement of the piston 14. At the same time, the liquid Freon is vaporized by the surrounding hot oil bath and converted into Freon gas with explosive buildup of pressure which drives the piston 14 downwardly and turns the associated crank arm which in turn rotates the cam 20 and allows the Freon valve to be moved still further rightwardly closing the inlet of liquid Freon through the port 46 and enabling the outlet of Freon gas through opening 25, the associated exhaust port 25b and thence through the line 52. This condition is shown in FIG. 2. The Freon gas passing from the engine 10 into the cooling well 54 is cooled and flow of the gas from the engine through the line 52 is facilitated by a relative vacuum provided by the condensation of the Freon inside the cooling well 54. As earlier stated, the liquid Freon is then drawn or pumped through the action of a pump 58 from the Freon cooling well 54 to the valve 48 in preparation for further cycles of operation of the engine.

It will thus be seen that the liquid vaporization engine provided by my invention can be readily connected to a power generator to convert its mechanical energy to electrical energy thus to provide electrical power generation. Also, the engine could be operated to provide direct motive drive to a variety of mechanical systems. The engine provided in accordance with my invention operates from solar heat and without requirement for fossil type fuel. It is a pollution-free engine which requires only the energy of the sun and well cooling, both readily available and without apparent limit in nature.

It will thus be seen that I have provided by my invention an improved liquid vaporization engine which is novel and represents a tremendous advancement in the field.

I claim:

1. An internal vaporization engine comprising a cylinder having a closed end and an open end; a piston reciprocally moveable in said cylinder; means for admitting a low boiling point liquid into said cylinder intermediate its closed end and said piston; a fluid means comprising a fluid heating medium container in communication with said cylinder open end for heating it and causing the expansion of said liquid to its vapor state to provide a power stroke of the piston; and valve means for removing the vaporized liquid from said cylinder on the return stroke of the piston preparatory to a second power stroke.

2. The combination as set forth in claim 1 wherein said low boiling point liquid is of the Freon type.

3. The combination as set forth in claim 1 wherein said means for admitting said low boiling point liquid comprises an inlet valve proximate the closed end of said cylinder.

4. The combination as set forth in claim 3 wherein said inlet valve and said valve means include ports of a common valve operating means.

5. The combination as set forth in claim 4 wherein a crank means is coupled to said piston for power take-off and wherein a connecting means is coupled between said crank means and a cam for timing the phased movement of the piston and the valve operating means.

6. The combination as set forth in claim 1 wherein said fluid heating medium comprises a hot liquid further in contact with said piston for lubricating it and maintaining it at an elevated temperature.

* * * * *